ELECTRIC WAVEFORM GENERATORS

Filed Oct. 5, 1953 3 Sheets-Sheet 1

INVENTOR.
BRIAN G. WELBY.
BY Stevens, Davis, Miller & Mosher
ATTORNEYS.

Nov. 11, 1958 B. G. WELBY 2,860,240

ELECTRIC WAVEFORM GENERATORS

Filed Oct. 5, 1953 3 Sheets-Sheet 2

INVENTOR.
BRIAN G. WELBY.
BY Stevens, Davis, Miller & Mosher
ATTORNEYS

INVENTOR.
BRIAN G. WELBY.
BY Stevens, Davis, Miller & Mosher
ATTORNEYS

United States Patent Office 2,860,240

Patented Nov. 11, 1958

2,860,240

ELECTRIC WAVEFORM GENERATORS

Brian Guy Welby, Sale, England, assignor to National Research Development Corporation, London, England, a corporation of Great Britain Application October 5, 1953, Serial No. 384,176

Claims priority, application Great Britain October 9, 1952

11 Claims. (Cl. 250—27)

This invention relates to electric waveform generating or shaping apparatus of the kind for producing an output voltage of square waveform in such dependence on an applied control signal that the leading edge of each square wave pulse is generated when such control signal passes in one direction from a datum level through a first predetermined voltage level and the trailing edge of each square wave pulse is generated when the said control signal passes in the reverse direction—i. e. towards the datum level—through a second predetermined voltage level which may or may not be the same level as the aforesaid first predetermined voltage level.

Shaping stages of this kind are well known and may, for example, be used in servo systems or the like where some operation has to be effected continuously during the interval that elapses between the time when the control signal passes through the first voltage level and the time when such signal passes in the reverse direction through the second voltage level as above described. The output square wave voltage may, in this case, be used to control the required operation so that the leading edge of each square wave initiates such operation and the ensuing trailing edge terminates it.

When the aforesaid first and second levels are coincident, as is frequently the case, the disadvantage sometimes arises that soon after the control signal has passed from the datum level through such common first and second levels, thereby causting the leading edge of a square wave output pulse to be generated, a random variation of the control signal brings the signal voltage momentarily back through the common level thereby causing generation of the trailing edge of the output square wave pulse and so terminating such square wave pulse prematurely.

It is already known to prevent this mis-operation by arranging that the second voltage level is nearer to the datum level than is the first voltage level so that any random fluctuation of the control signal which may occur after the first level has been reached and the leading edge of the square wave pulse developed, would have to be large enough to extend as far as the second voltage level for it to cause premature termination of the square wave pulse. Such known kinds of apparatus for achieving this difference or "backlash" between the first and second levels are, however, of relatively complicated character and correspondingly expensive to manufacture in view of the additional components required.

One object of the present invention is to provide an improved and simplified waveform generating or shaping apparatus of the type set forth above and in particular to provide such a shaping stage in which the kind of mis-operation described above is, to at least a large extent, eliminated.

In accordance with the present invention a waveform generating or shaping stage of the kind set forth includes a thermionic valve having at least an anode and a cathode and a suppressor grid, a screen grid and a control grid disposed, in that order between said anode and cathode and arranged for action in the known transitron manner but modified in that said screen grid and said suppressor grid are additionally coupled by a resistor, a negative feed-back path between said anode and said control grid, means for applying said control signal to said control grid so that said control grid is biased to cut-off when said control signal is at said datum level and so that both the said predetermined levels are in a positive-going direction from said datum level, and connections for deriving the output square wave voltage either from said suppressor grid or from said screen grid, the arrangement being such that when said control signal reaches said first predetermined level the working point on the anode voltage/anode current characteristic of the valve reaches the upper bend thereof, thereby causing initiation of a transitron-like action and so causing the voltage on said screen grid to fall abruptly, said second predetermined level being that which said control signal, on returning towards said datum level from said first level, causes a reverse transitron-like action.

Said negative feed-back path may include a time constant network, the time constant of which is short compared with the minimum time taken by said control signal to pass from said datum level to said first predetermined level.

In order that the nature of the present invention may be more readily understood a practical application thereof will now be described in detail with reference to the accompanying drawings in which:

Fig. 1 is a block schematic diagram showing the principal elements of a reading or translating device for a perforated paper tape.

Fig. 2 comprises a series of explanatory waveform diagrams.

Figure 3:
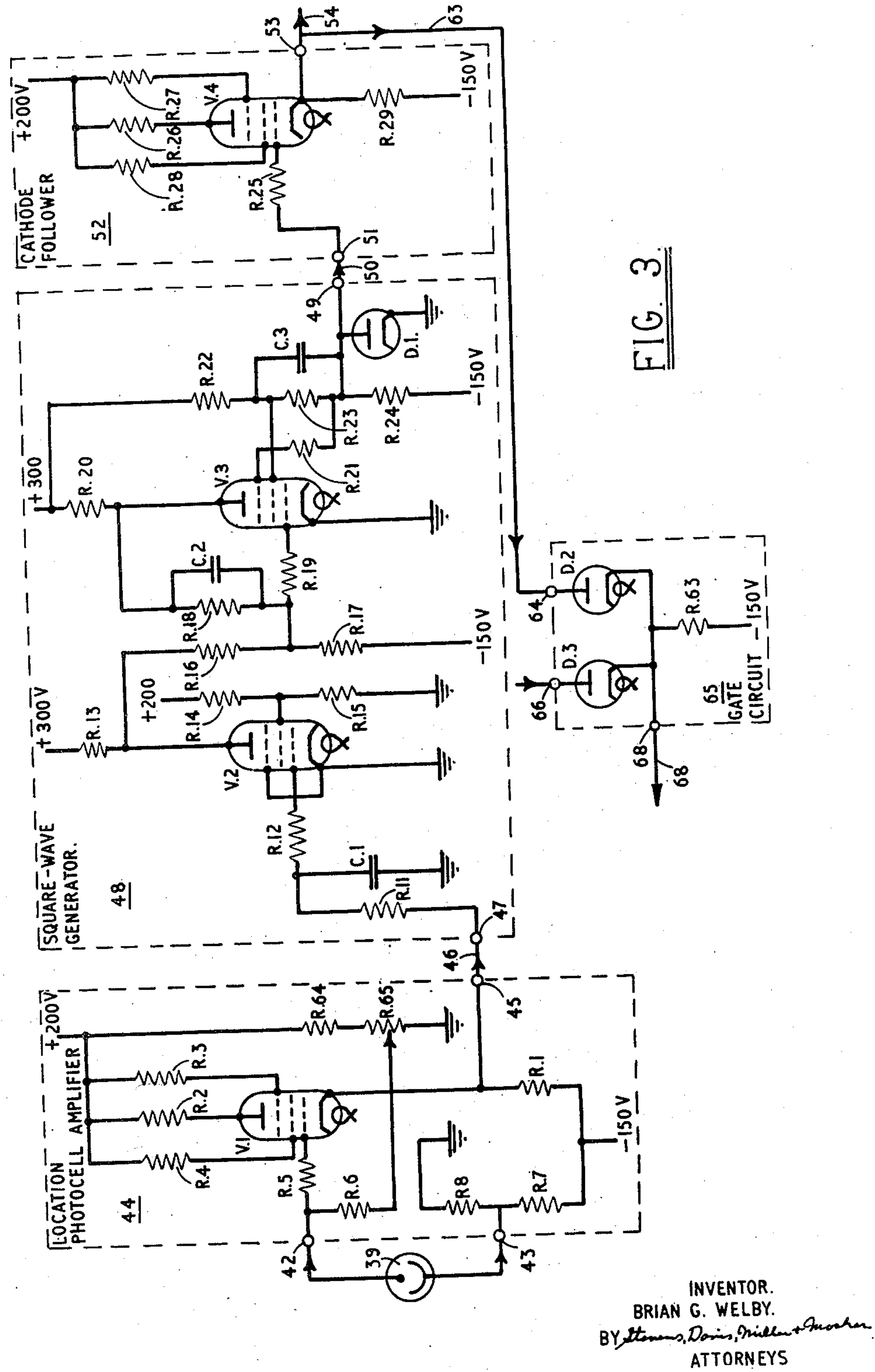
Fig. 3 is a detailed circuit diagram of one form of wave shaping or generating device in accordance with the invention and certain apparatus associated therewith.
Figures 4, 5:
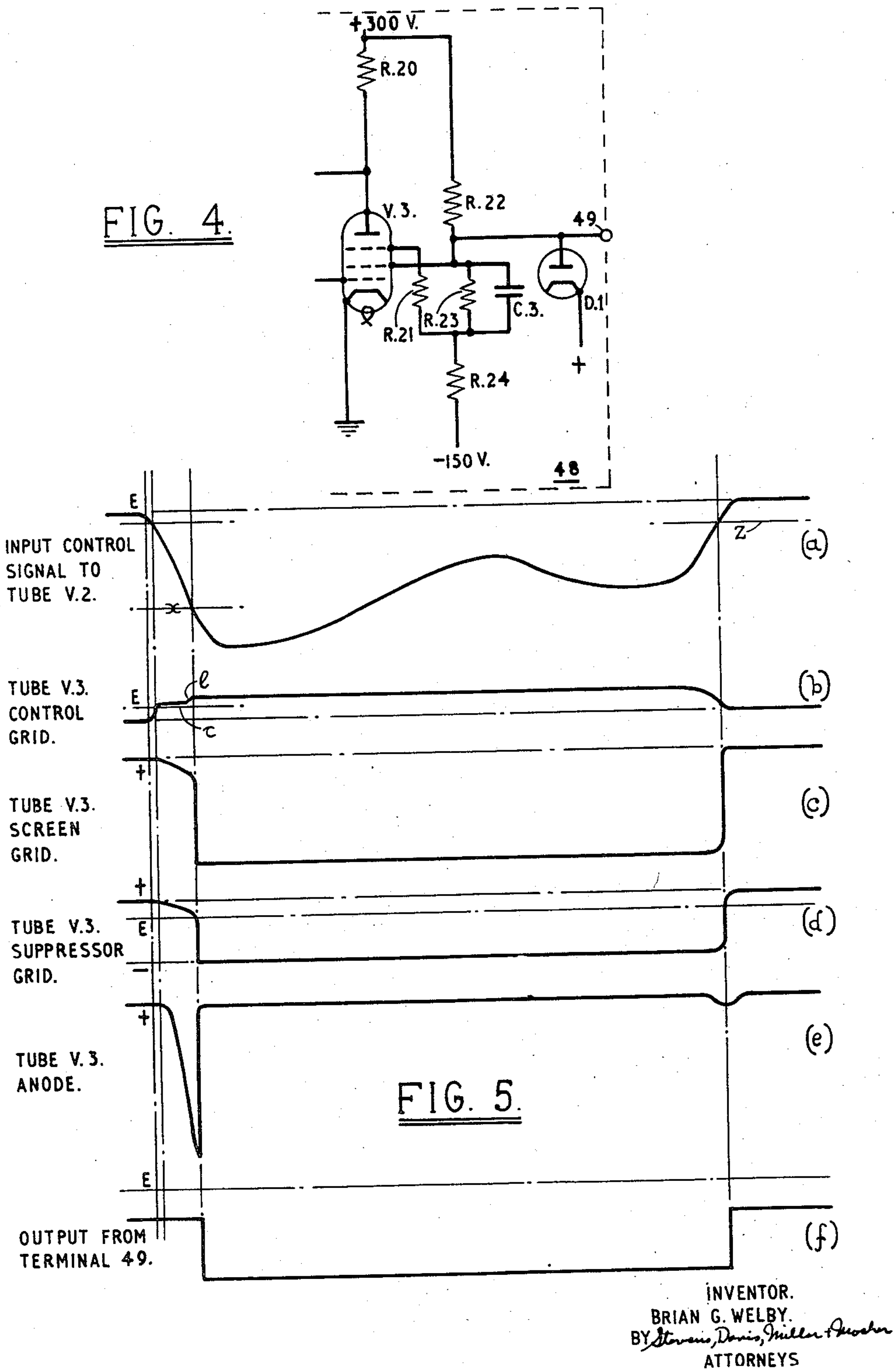
Fig. 4 is a fragmentary view of part of the circuit of Fig. 3 showing a modification.

Fig. 5 comprises a further series of waveform diagrams illustrating the manner of operation of the circuit of Figs. 3 or 4.

Figure 1:
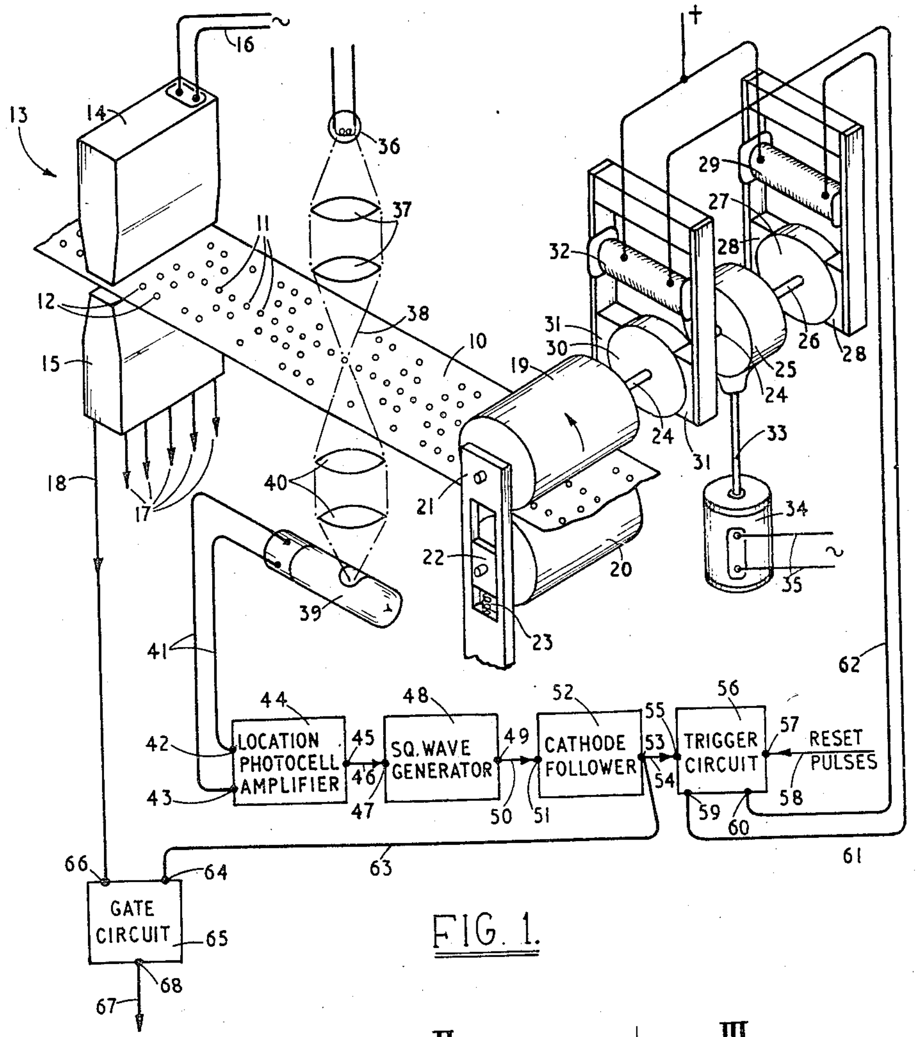

Referring first to Fig. 1, the device to which the invention is shown applied consists of a reading or translating device for use with perforated tape 10 of the conventional kind as used in telegraphic and like apparatus and also in electronic computing machines for the insertion and withdrawal of data information. Such tape is perforated in the usual way with a central row of equi-spaced feed holes 11 and with additional symbol or character-indicating perforations 12, e. g. in accordance with the standard 5-unit code, at the different character positions in transverse alignment one with each feed hole. The tape is arranged to be progressed past a reading head structure 13 which may conveniently comprise a housing 14 for a plurality of, e. g. 5, separate light sources on one side of the tape 10 and a housing 15 for a corresponding number of photocells on the other side of the tape.

It is necessary to move the tape 10 through the reading head 13 to pass from one character position to the next and also to arrest such tape when the perforations 12 of any one character position thereon are properly in register with the reading head so that the light beams from the light sources of such head within the housing 14 may be applied to the region containing the perforations 12 of the tape and the resultant output from the associated photocells within the housing 15 used to actuate other apparatus to read the particular combination of punchings which are to be found in any one character position. Current for the light sources in housing 14 is supplied from a suitable, e. g. 12 volt A. C. source over leads 16 while the respective outputs from the photocells in housing 15 are fed out by means of individual leads 17 and a common lead 18. As the form of the head structure 13 is of no concern to the present invention it will not be further described.

In the present embodiment the tape 10 is not moved and arrested in the customary manner by means of the row of feed holes 11 in view of the high speed of operation which is desired. Instead, the tape 10 is frictionally driven by being gripped between two parallel rollers 19, 20. Roller 19 is journalled in rigid bearings 21 but the roller 20 is carried in bearing blocks 22 which are urged by compression springs 23 towards the roller 19. Roller 19 is secured to a shaft 24 which forms one output shaft from a differential type gearbox 25 whose other output shaft 26 carries thereon a drum 27 engageable by brake shoes 28 when a controlling magnet coil 29 is suitably energised. The shaft 24 is similarly provided with a brake drum 30 which is engageable by brake shoes 31 when a controlling magnet coil 32 is energised. The input shaft 33 to the differential gearbox 25 is connected to a constantly rotating electric motor 34 energised over leads 35 from a suitable A. C. supply.

The feed holes 11 are employed for controlling the arrest and accurate registration of the tape 10 with each group of character-indicating perforations 12 in alignment with the elements of the reading head 13 and for this purpose there is provided a light source 36 and an associated optical projection system 37 on one side of the tape whereby a light beam 38 may be directed in turn through each of such feed holes 11 on to a second optical system 40 which focuses the received light on to a light-responsive element such as a photocell 39.

The output from the location photocell 39 is applied over leads 41 to the input terminals 42, 43 of a location photocell amplifier 44 whose precise form will be described in detail later. The output terminal 45 of this amplifier is connected over lead 46 to the input terminal 47 of a square-wave shaping or generating circuit 48. This square-wave generator 48, whose form according to the invention will be described in detail later, has its square waveform output from output terminal 49 supplied over lead 50 to the input terminal 51 of a cathode follower valve stage 52 having an output terminal 53.

The square wave output at terminal 53 comprises a series of negative-going pulses, one for each of the periods when the light beam 38 is permitted to pass through the successive feed holes 11 in the tape 10. This square wave is applied over lead 54 to the triggering input terminal 55 of a conventional two-stable-state multivibrator or trigger circuit 56 whose other resetting input terminal 57 is supplied by way of lead 58 with negative-going pulses whose leading edges mark the instants of completion of the actual character reading operation performed by the reading head structure 13. The trigger circuit 56 comprises the usual pair of vacuum tubes cross-connected, e. g. between their respective anodes and suppressor grids by direct-current paths as illustrated, for example, in "Ultra High Frequency Techniques" by Brainerd et al. (Chapman and Hall—1942) at page 174. The input terminal 55 is coupled by way of a differentiating network to the control grid of one tube and the input terminal 57 by way of a similar differentiating network to the control grid of the other tube whereby the negative-going leading edge of each of the applied square waves serves to cut off the directly associated tube and to turn the opposite tube full on. Two anti-phase output square waveforms, derived from either the anodes or the suppressor grids of the two tubes, are available from such a circuit at output terminals 59, 60. That from terminal 59 provides a current pulse during the period when the circuit 56 is in its triggered or "on" state for application over lead 61 to energise the magnet coil 32 whereas that from terminal 60 provides a current pulse during the period when the circuit 56 is in its reset or "off" state for application over lead 62 to energise the magnet coil 29.

The square wave output from terminal 53 is also applied over lead 63 to one input terminal 64 of a two-input coincidence type gate circuit 65 whose other input terminal 66 is connected to the common lead 18 of the photocells in the housing 15. The output terminal 68 of this gate circuit is connected to lead 67 which constitutes the common lead connection from the various photocells in housing 15 whereby, when gate circuit 65 is blocked owing to the absence of a suitable negative-going potential at terminal 64 the various photocells are inoperative and when such gate circuit 65 is opened by application of a suitable negative potential to terminal 64, all of the photocells are rendered operative.

The broad outline of the manner of operation of the arrangement described is as follows. Assuming that the tape 10 is being moved from one character-indicating reading position to the next. Under such conditions, the trigger circuit 56 is in its reset or "off" state whereby magnet coil 29 is energised and magnet coil 32 is de-energised. In consequence shaft 26 is held stationary and, by the action of the differential gearbox 25, motor 34 will rapidly rotate shaft 24 and roller 19 to cause linear feeding movement of the tape 10. At this time the output square wave from terminal 53 is at its raised or resting level and in consequence gate circuit 65 is blocked and the reading head 13 is inoperative.

Eventually the arrival of the next feed hole 11 into register with the light beam 38 from the optical system 37 allows light to pass to the second optical system 40 and thence to the photocell 39. This causes the generation of a negative-going output for application to amplifier 44 whereby the latter provides a similar negative-going voltage to the square wave generator 48. When such voltage passes through a first predetermined level it initiates a sharp square wave pulse of negative polarity at output terminal 49 and this, after being cathode followed in circuit 52 provides, by differentiation of its leading edge, a triggering pulse to reverse the condition of trigger circuit 56 whereby the output polarities of the latter are reversed. This causes magnet coil 29 to be de-energized and magnet coil 32 to be energised so that the roller 19 is rapidly arrested and the linear motion of the tape 10 stopped with the beam 38 still registered with the related feed hole 11. In this position the associated character-indicating perforations 12 are correctly aligned with the reading head structure 13. At the same time, the negative-going output from terminal 53 operates the gate circuit 65 to its conductive or opened condition whereby the circuits of the various photocells within the housing 15 can become operative over their respective leads 17 in a manner as required by the reading operation which now takes place. As the various elements of the associated device to which the invention is shown applied and by which such reading operation is controlled are in no way concerned with the present invention they will not be further described.

When such reading operation is completed, a negative-going pulse is supplied over lead 58 to reset the trigger circuit 56 to its "off" state whereupon magnet coil 32 is de-energised and magnet coil 29 is energised again. This causes roller 19 again to be driven by motor 34 and a further linear movement of the tape 10 is initiated. Immediately this occurs the feed hole 11 which was in register with the beam 38 begins to move to cut off light from photocell 39 and, in consequence, the negative-going output from the latter is decreased and the corresponding voltage from amplifier 44 at input terminal 47 returns towards its original datum level. When such voltage passes through a (second) predetermined level the original negative square wave pulse output from the generator 48 is abruptly terminated whereby the corresponding output from the cathode follower circuit 52 over lead 63 causes the gate circuit 65 again to become blocked. The termination of the output pulse from generator 48 is ineffective upon the trigger circuit 56 which is responsive only to negative-going inputs. The cycle of operations is repeated for each feed hole 11.

It frequently happens, particularly when, as in the example being described, the control voltage for a square wave shaping or generating circuit is derived from an element such as a photocell, that the potential of the control signal or pulse after passing from a normal datum e. g. zero, level through the first predetermined voltage level which is chosen to mark the commencement or leading edge of the required square wave output pulse, is subject to random variation whereby it may pass momentarily back through such first predetermined level towards the datum level and then pass again through such level before the required proper instant for the termination of the square wave output pulse. If such first predetermined level and the second predetermined level at which the termination of the square wave pulse is effected are the same then improper pulse formation will result and there will be two separated square wave pulses instead of a single continuous pulse. Alternatively, if, after its recession, the control voltage fails again to pass through the first predetermined level there will be only one shortened square wave output pulse. Such momentary variations are liable to occur when the light sources within the housing 14 are operated by alternating current.

Figure 2:
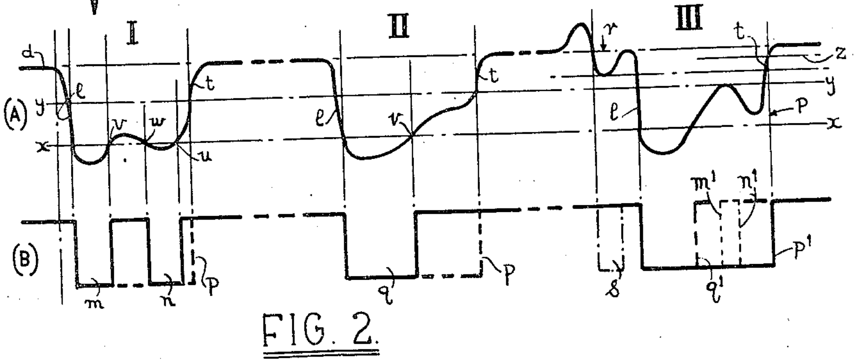

Thus referring to Fig. 2 (*a*) one possible form of control signal is shown at I. In this instance the control voltage pulse in passing from its datum level *d* has a leading edge *l* of appreciable slope and, after passing through the first predetermined level *x* chosen to mark the initiation of the output square wave pulse, is subject to subsequent random variation and returns through such level *x* as shown at *v* before again passing through it at *w* prior to the eventual termination of the pulse by its trailing edge *t*. If the aforesaid first and second predetermined levels which control respectively the commencement and termination of the generated square wave pulses are both of them made equal to the level *x* then two separate square wave pulses will be generated as shown at *m* and *n* in Fig. 2 (*b*) instead of a single pulse such as that indicated in dotted lines at *p*. Another possible form of control pulse is shown at II in Fig. 2 (*a*) where the control voltage after passing by its leading edge *l* through the first predetermined level *x* has a subsequent variation whereby it returns through the same level *x* as indicated at *v* and does not thereafter exceed that level at any time before the trailing edge *t* of the pulse. In this case if the first and second predetermined levels are both of the value of level *x* a single pulse only will be generated as shown in full lines at *q* in Fig. 2 (*b*) and this pulse is shorter than the required pulse period *p* shown in dotted lines.

With such a scheme of employing a common level such as that of level *x* for both the first and second predetermined levels governing the formation of the output square wave pulse, it is necessary to shift the chosen level to some value such as indicated at *y* in Fig. 2 (*a*) and this may, in practice, be too close to the datum level *d*, for reliable operation. Furthermore the control voltage may be one which is itself subject, in its normal or quiescent condition, to random variation about its ordinary mean datum level. Thus as shown at III in Fig. 2 (*a*) the control voltage is indicated as being subject to considerable random variation both about its mean datum level at *r* and during an actual pulse period *p*. In such circumstances if the chosen common level is set at *x* then only one short pulse will be generated as shown at *q*1 in Fig. 2 (*b*) whereas if it is set at level *y* two separated pulses *m*1 and *n*1 will be generated. On the other hand if a common level *z* is chosen much closer to the datum level *d* in order to ensure non-interference by random variation during the actual pulse period, there may be spurious pulse generation during a non-pulse period due to random variation about the mean datum level. Such a spurious pulse is indicated at *s* in Fig. 2 (*b*). The solution to the difficulty is, as has already been indicated, to make the first predetermined level at which the leading edge of the square pulse output is initiated at a level such as *x*, Fig. 2 (*a*) which is appreciably displaced from the datum level and to make the second predetermined level at which the trailing edge of the output square wave pulse is initiated at some second level such as *z* which is much closer to and preferably quite close to the normal datum level. If this is done then a full length single pulse output can be reliably provided as shown at *p*1 in Fig. 2 (*b*) even under most adverse conditions of random variation.

Referring now to Fig. 3 which shows, in detail, the form of the location photocell amplifier 44, the square wave generator 48, the cathode follower stage 52 and the gate circuit 65 of Fig. 1, the location photocell amplifier circuit includes a pentode tube V1 having its anode, its suppressor grid and its screen-grid electrodes each connected to the source of positive potential +200*v* by way of individual resistors R2, R3 and R4 (each 470 ohms). The cathode of the tube V1 is connected by way of resistor R1 (27 kilo-ohms) to a source of negative potential −150*v* while the cathode is also connected to the output terminal 45. The control grid of the tube V1 is connected by way of resistor R5 (470 ohms) to input terminal 42 leading to the anode electrode of photocell 39 while input terminal 43 leading to the cathode electrode of the photocell is connected to the common junction point of resistors R7 (27 kilo-ohms) and R8 (33 kilo-ohms). The opposite end of resistor R7 is connected to the source of negative potential −150*v* while the opposite end of resistor R8 is connected to earth whereby such tapping point has a potential substantially negative with respect to earth. The input terminal 42 is also connected by way of resistor R6 (10 megohms) to the slider of a potentiometer R65 (1 kilo-ohm) one end of which is earthed and the opposite end of which is connected by way of resistor R64 (47 kilo-ohms) to the source of positive potential +200*v*.

The operation of this circuit is as follows. With the photocell 39 non-illuminated, tube V1 is passing current and the adjustment of the slider of potentiometer R65 is such that the potential at the output terminal 45 is at about +4 v. relative to earth. Illumination of the photocell 39 causes a fall in the potential applied to the control grid of valve V5 with the development of a corresponding negative-going output waveform at the terminal 45. Such output is subject to a random variation in the potential developed even when the cell is fully illuminated due to various causes including, particularly, variation of the light output from the relevant illuminating lamp forming the light source 36 (Fig. 1) when such lamp is energised in the usual way by alternating current. The output from terminal 45, which forms the effective control signal used in the wave shaping or square wave generator circuit 48 may have, for instance, any of the forms I, II or III shown in Fig. 2 (*a*).

The wave shaping or generator circuit 48 comprises a first vacuum tube V2 which is conveniently a pentode of the Mullard type E. F. 50 but may be a triode. This tube has its cathode connected directly to earth and its control grid connected by way of resistor R12 (470 ohms) and resistor R11 (10 kilo-ohms) to input terminal 47. This input terminal is that which is connected by way of lead 46 to the output terminal 45 of the location photocell amplifier circuit 44 just described. The junction between resistors R11 and R12 is connected to one terminal of a capacitor C1 (1000 micro-microfarads), the other terminal of this capacitor being connected to earth. The screen grid of tube V2 is connected to the junction of resistor R14 (22 kilo-ohms) and resistor R15 (33 kilo-ohms). The opposite end of resistor R14 is connected to a source of positive potential +200v while the opposite end of resistor R15 is connected to earth. The suppressor grid of tube V2 is connected directly to earth while the tube anode is connected by way of resistor R13 (68 kilo-ohms) to a source of positive potential +300v and also to one terminal of a resistor R16 (470 kilo-ohms) which is connected to turn to resistor R1 being connected to the source of negative potential −150v. The junction point between resistors R16 and R17 is connected by way of resistor R19 (470 ohms) to the control grid of a second vacuum tube V3 which is also of Mullard type E. F. 50. The cathode of this second tube V3 is connected directly to earth while its anode is connected by way of resistor R20 (100 kilo-ohms) to the source of positive potential +300v. The anode of tube V3 is also connected by way of a time-constant network comprising resistor R18 (1.5 megohms) and parallel-connected capacitor C2 (100 micro-microfarads) to the junction point between resistors R16, R17 and R19. Between the source of positive potential +300v and the source of negative potential −150v is connected a chain of resistors R22 (47 kilo-ohms), R23 (470 kilo-ohms) and R24 (330 kilo-ohms). A capacitor C3 (100 micro-microfarads) is shunted across resistor R23 and the junction point between resistors R22 and R23 is connected directly to the screen grid of tube V3 while the junction point between resistors R23 and R24 is connected by way of resistor R21 (470 ohms) to the suppressor grid of tube V2.

The junction between resistors R23 and R24 is also connected to the output terminal 49 and to the anode of a diode D1 of Mullard type E. A. 50 whose cathode is directly connected to earth.

The operation of this square-wave shaping or generator circuit is as follows. The circuit constants are such that when the control signal applied to input terminal 47 is at its normal datum level, the tube V2 is fully conducting as its control grid is supplied with a potential which is positive to earth, and therefore positive with respect to the tube cathode. In consequence the anode of tube V2 is at a relatively low potential due to the voltage drop across resistor R13 and, correspondingly, the control grid of tube V3 is low and is sufficiently negative, due to the resistor values of the network of R16 and R17, to hold the pentode tube V3 cut off. Under these circumstances the connection point of the output terminal 49 to the junction of resistors R23 and R24 is raised to its highest level which is that of earth potential at which it is held by the operation of the clamping diode D1.

The control signal applied to the input terminal 47 is, as already explained, negative-going from its slightly positive datum level and in consequence the control signal, as applied to the control grid of the pentode tube V3 from the anode of the tube V2 by way of the intermediate resistor R16, is of opposite phase and has the aforesaid predetermined levels in the positive-going direction from the datum level. One example of control grid potential for tube V2, conforming to an initial signal similar to that at II in Fig. 2 (*a*) is shown in Fig. 5 (*a*).

As soon as the control signal voltage on the control grid of the tube V2 begins to fall from its datum level the anode potential of the tube V2 begins to rise, carrying with it the potential of the control grid of the tube V3. Eventually on reaching the level *c*, Fig. 5 (*b*) the tube V3 starts to conduct, whereupon the rate of rise in its grid potential is reduced owing to the feedback applied through the resistor R18 of the time constant network R18, C2; at this comparatively slow rate of change the effect of the feedback capacitor C2 can be disregarded; the time constant of the feedback network being short compared with the minimum time taken for the control signal to reach the first predetermined level. Owing to the comparatively small proportion of the total cathode current in the pentode tube V3 taken by the screen grid only a small change takes place in the potential of the screen grid, and the fall of potential at the junction of resistors R23, R24 is as yet insufficient to affect the potential of the output terminal 49 which is still held at earth level by the action of clamping diode D1.

The anode potential of the tube V3 continues to fall as shown in Fig. 5 (*e*) until the working point on the anode voltage/anode current characteristic for the tube reaches the upper bend of the characteristic. The negative feedback through resistor R18 then ceases and the potential of the control grid accordingly becomes free to rise (momentarily) at the faster rate imposed by the rate of change of the control signal as shown at *e* in Fig. 5 (*b*). The screen grid of the tube V3 therefore now takes much more current and falls in potential more quickly and thereby drives the suppressor grid negatively at this faster rate owing to the interconnecting resistor R23. The pentode tube V3 thus begins to be cut off at its suppressor grid, and its anode potential immediately begins to rise again (Fig. 5 (*e*)) rapidly enough for its effect to be transmitted to the control grid by way of the feedback capacitor C2 of the time constant network. The resulting rapid rise in control grid potential increases still further the rate of fall of the screen and suppressor potentials, these latter grids now interacting in the usual transitron-like manner through the agency of the coupling capacitor C3, and thus increasing the rate of rise of the anode potential, see Figs. 5 (*c*), 5 (*d*) and 5 (*e*). The net result of this rapid switching action, the initiation of which occurred when the control signal reached its first predetermined level, is an abrupt fall in suppressor potential to a value negative with respect to earth and hence the application to the output terminal 49 of the leading edge of the negative-going square wave pulse which is required to be generated.

The potential of the suppressor grid, and hence the output potential, remains at a low negative value until the control signal has returned to a level, i. e. the second predetermined level, which is much nearer the datum level than is the first predetermined level. This second level is reached when the potential of the control grid of the pentode tube V3 has fallen near enough to the cut-off value for the reverse transitron-like action to be initiated. The trailing edge of the square wave on the output lead is thus generated as shown in Figs. 5 (*c*), 5 (*d*) and 5(*e*).

The difference in the location of the two predetermined levels is due to the fact that the two switching actions take place at widely different values of anode voltage on the pentode tube V3. The first switching action takes place when the anode of tube V3 has the low voltage appropriate to anode current saturation; the anode voltage of the preceding tube V2 then having a high value (which in fact is that appropriate to cut-off). Now when the control signal is initially at the datum level the tube V2 is fully conducting and its anode voltage is at a low value. Consequently a comparatively wide excursion of the control signal is required to reduce the space current of tube V2 from saturation to near cut-off and so bring about the first switching action. Thus the first predetermined level is at a comparatively large distance from the datum level.

On the other hand the second switching action takes place when the anode of tube V3 has the high value appropriate to anode current cut-off whereas the anode voltage of the tube V2 then has a low value, which in fact is only a little higher than its value when the control signal is at datum level. Consequently the second predetermined level is at a comparatively small distance from the datum level.

The resultant output waveform shown in Fig. 5 (*f*) comprises a single negative-going pulse lasting from the instant when the control signal passed through the first predetermined level when moving away from its datum level to the point when such control signal passed through the second predetermined level when moving in a direction towards such datum level. In consequence any random variation of the control signal which may occur in betwen these two times and which might suffice to take it through the first predetermined level, is ineffective to cause any alteration of the state of the tube V3 or the output signal.

The cathode follower 52, to which the output from terminal 49 comprising the negative-going pulse shown in Fig. 5 (*f*) is applied, is of conventional form and comprises a tube V4, conveniently of Mullard type E. F. 55, having its anode, suppressor grid and screen grid electrodes each connected to the source of positive potential **+200*v* by way of resistors R26, R27 and R28 (each 100 ohms) respectively. The control grid of the tube is connected to the input terminal 51, which receives the output pulse from generator 48, by way of resistor R25 (470 ohms) while the cathode of the tube is connected by way of resistor R29 (8.2 kilo-ohms) to the source of negative potential −150*v*. The cathode of this tube, which constitutes the output point of the circuit, is conneeted directly to the output terminal 53**.

The operation of this circuit is exactly in accordance with normal cathode follower practice, the resultant output at terminal 53 being a negative-going pulse waveform similar to that of Fig. 5 (*f*).

The gate circuit 65 is also of well known form and comprises diodes D2, D3. The input terminal 64 is connected to the anode of diode D2 whereas the input terminal 66 is connected to the anode of diode D3. The two cathodes of the diodes D2, D3 are interconnected and joined to the output terminal 68 and also by way of resistor R63 (47 kilo-ohms) to the source of negative potential **−150*v***.

The operation and purpose of such gate device in the particular arrangement described is as follows. It is essential for ensuring proper reading of the character-indicating perforations 12 in the tape 10 that the tape shall be arrested with the holes thereof in proper register with the elements of the reading head 13. If, due for example to faulty operation of the braking apparatus of drum 30 and brake shoes 31 (Fig. 1), the tape should be arrested too slowly after the triggering of the associated trigger circuit 56 by the leading edge of the square pulse from the waveform generator 48 and cathode follower circuit 52 at output terminal 53, faulty operation might ensue since the character-indicating perforations 12 in the tape would not be properly aligned with the reading head. By the supply of the output pulse from terminal 53 to the input terminal 54 and diode D2 it is ensured that the read operation, which is controlled by potentials applied through terminal 66 to the other diode D3 only takes place if the negative-going pulse from the circuit 52 is maintained. Therefore, in the case quoted above, where the breaking apparatus was defective, the continued movement of the tape 10 past the position of the beam 38 and location photocell 39 would produce a termination of the control voltage output pulse which in turn would terminate the square pulse output from the output terminal 53.

Various modifications may obviously be made within the scope of the invention. Thus the output from the wave shaping or generator circuit 48 may be derived from the screen grid of tube V3 rather than from the suppressor grid of this tube. Fig. 4 indicates such modification. Similarly the invention is applicable to a wide variety of purposes other than that of the particular embodiment chosen for illustration and may be used for substantially any purpose which requires the production of a squareform output pulse from a control voltage which is of pulse-like form but which is subjected to random variation of superimposed modulation thereon such as would normally render it unreliable or unusable for accurate control purposes. The "backlash" effect obtained by the reason of the difference of said first and second predetermined levels may also be usable in analogue computing systems for the simulation of certain conditions such as backlash in gearing.

I claim:

1. A wave shaping device comprising a first thermionic valve having an anode, a cathode and first, second and third grids arranged between said anode and cathode in that order, a second thermionic valve having at least an anode, a cathode and a control grid, an input terminal for connection to a source of control signals which include pulses of negative polarity from a resting level slightly positive with respect to earth potential, an output terminal, circuit means connecting said input terminal to said control grid of said second valve, circuit means connecting said cathode of said second valve to earth, an anode load resistor connected between said anode of said second valve and a source of positive potential, a potentiometer network of first and second resistors connected between said anode of said second valve and a source of potential negative with respect to earth potential, a direct current connection between the junction point of said first and second resistors and said third grid of said first valve, an anode load resistor connected between said anode of said first valve and a source of positive potential, a third resistor connected between said anode and said third grid of said first valve, a first capacitor connected in parallel with said third resistor, a fourth resistor connected between said first and second grids of said first valve, a second capacitor shunted across said fourth resistor, a fifth resistor connected between said second grid of said first valve and a source of positive potential, a sixth resistor connected between said first grid of said first valve and a source of potential negative with respect to earth, means connecting said cathode of said first valve to earth, a connection between said output terminal and one end of said fourth resistor and a diode having its anode connected to said output terminal and its cathode connected to a point of stable potential, said junction point of said first and second resistors being arranged to have a standing potential sufficiently negative with respect to earth to cut-off said first valve at its third grid and said diode being conducting when said control signals are at their resting level.

2. A waveform generating device which comprises a thermionic vacuum tube having at least an anode and a cathode and a suppressor grid, a screen grid and a control grid disposed between said anode and cathode in that order, a first resistor connected between said suppressor grid and said screen grid, a capacitor connected in parallel with said first resistor, a second resistor connecting said screen grid to a source of positive potential, a third resistor connecting said suppressor grid to a source of negative potential, a fourth resistor connecting said anode to a source of positive potential, a fifth resistor connected between said anode and said control grid, a source of positive-going pulse form control signals connected to said control grid, biasing means connected to said control grid for maintaining it below the space current cut-off level in the absence of said control signal and an output terminal connected to said suppressor grid.

3. A waveform generating device which comprises a thermionic vacuum tube having at least an anode and a cathode and a suppressor grid, a screen grid and a control grid disposed between said anode and cathode in that order, a first resistor connected between said suppressor grid and said screen grid, a capacitor connected in parallel with said first resistor, a second resistor connecting said screen grid to a source of positive potential, a third resistor connecting said suppressor grid to a source of negative potential, a fourth resistor connecting said anode to a source of positive potential, a fifth resistor connected between said anode and said control grid, a source of positive-going pulse form control signals connected to said control grid, biasing means connected to said control grid for maintaining it below the space current cut-off level in the absence of said control signal and an output terminal connected to said screen grid.

4. A waveform generating device which comprises a thermionic vacuum tube having at least an anode and a cathode and a suppressor grid, a screen grid and a control grid disposed between said anode and cathode in that order, a first resistor connected between said suppressor grid and said screen grid, a capacitor connected in parallel with said first resistor, a second resistor connecting said screen grid to a source of positive potential, a third resistor connecting said suppressor grid to a source of negative potential, a fourth resistor connecting said anode to a source of positive potential, a time constant network connected between said anode and said control grid, a source of positive-going pulse form control signals connected to said control grid, biasing means connected to said control grid for maintaining it below the space current cut-off level in the absence of said control signal and an output terminal connected to said suppressor grid.

5. A waveform generating device which comprises a thermionic vacuum tube having at least an anode and a cathode and a suppressor grid, a screen grid and a control grid disposed between said anode and cathode in that order, a first resistor connected between said suppressor grid and said screen grid, a capacitor connected in parallel with said first resistor, a second resistor connecting said screen grid to a source of positive potential, a third resistor connecting said suppressor grid to a source of negative potential, a fourth resistor connecting said anode to a source of positive potential, a time constant network connected between said anode and said control grid, a source of positive-going pulse form control signals connected to said control grid, biasing means connected to said control grid for maintaining it below the space current cut-off level in the absence of said control signal and an output terminal connected to said screen grid.

6. A wave generating circuit comprising a thermionic vacuum tube having an anode, a cathode and at least a suppressor grid, a screen grid and a control grid between said anode and cathode in that order, a resistive network of first, second and third resistors in series between a source of positive potential and a source of negative potential, a capacitor shunted across said second resistor, connections between said screen grid and the junction of said first and second resistors and between said suppressor grid and the junction between said second and third resistors, a fourth resistor connected between said anode and a source of positive potential, a source of control signals which include pulses positive-going from a datum level, connected to said control grid, a connection between the cathode of said tube and a source of potential sufficiently positive with respect to said datum level to cause cut-off of space current flow in said tube in the absence of a positive-going pulse in said control signals and a feed-back path between said anode and said control grid.

7. A wave generating circuit comprising a thermionic vacuum tube having an anode, a cathode and at least a suppressor grid, a screen grid and a control grid between said anode and cathode in that order, a resistive network of first, second and third resistors in series between a source of potential positive with respect to earth and a source of potential negative with respect to earth, a capacitor shunted across said second resistor, connections between said screen grid and the junction of said first and second resistors and between said suppressor grid and the junction between said second and third resistors, a fourth resistor connected between said anode and a source of positive potential, an input terminal for connection to a source of control signals which include pulses positive-going from a datum level which is more negative with respect to earth than the control grid cut off level of said tube, a connection between the cathode of said tube and earth, a direct current feed-back path including a parallel connected resistor and capacitor between said anode and said control grid and an output connection from a tapping point on said resistive network.

8. A wave shaping device comprising a first thermionic vacuum tube having an anode, a cathode and first, second and third grids arranged between said anode and cathode in that order, a second thermionic vacuum tube having at least an anode, a cathode and a control grid, an input terminal, an output terminal, circuit means connecting said input terminal to said control grid of said second tube, a first anode load circuit connected between said anode of said second tube and a source of positive potential, circuit means connecting a point on said anode load circuit to said control grid of said first tube, a second anode load circuit connected between said anode of said first tube and a source of positive potential, a negative feed-back path between said anode and said control grid of said first tube, a first resistor connected between said first and second grids of said first tube, a capacitor shunted across said first resistor, a second resistor between said second grid of said first tube and a source of positive potential, a third resistor between said first grid of said first tube and a source of negative potential and circuit means connecting said output terminal to one end of said first resistor.

9. A wave shaping device comprising a first thermionic vacuum tube having at least an anode, a cathode and first, second and third grids arranged between said anode and cathode in that order, a second thermionic vacuum tube having at least an anode, a cathode and a control grid, an input terminal, an output terminal, circuit means connecting said input terminal to said control grid of said second tube, a first anode load resistor connected between said anode of said second tube and a source of positive potential, circuit means connecting a point of said first anode load resistor of said second tube to said control grid of said first tube, a second anode load resistor connected between said anode of said first tube and a source of positive potential, a negative feed-back path including a time constant network between said anode and control grid of said first tube, a first resistor connected between said first and second grids of said first tube, a capacitor shunted across said resistor, a second resistor between said second grid and a source of positive potential, a third resistor between said first grid and a source of negative potential, an output connection between said output terminal and one end of said first resistor and a unilaterally conductive device having its anode connected to said output terminal and its cathode connected to a source of potential which is negative with respect to the standing potential of said output connection when said first tube is cut-off at its control grid.

10. A waveform generating device for producing an output voltage of square waveform in dependence upon a control signal such that the leading edge of each square wave output pulse is generated when the control signal passes in one direction from a datum voltage level through a first predetermined voltage level and the trailing edge of such output pulse is generated when such control signal passes in the reverse direction through a second predetermined voltage level and which includes a first thermionic valve having at least an anode, a suppressor grid, a screen grid, a control grid and a cathode in that order and arranged for transitron action between its screen grid and its suppressor grid and modified in that said screen grid and said suppressor grid are additionally coupled by a resistor, a negative feedback path between said anode and said control grid, a source of input control signals for said first valve, said source comprising a second thermionic valve including at least an anode, a control grid and a cathode in that order, a load resistor in the anode circuit of said second valve, a direct current connection including a series-connected potentiometer network between said anode and a source of potential negative with respect to the cathode of said second valve, and a signal input connection to the control grid of said second valve for supply with an initial control signal in which the signal voltage variations are negative-going with respect to a predetermined datum level, a direct current output connection between an intermediate tapping point on said potentiometer network and said control grid of said first valve whereby the output signals from said second valve provide input control signals to said first valve of a form such that the control grid of said first valve is biased to cut-off when said input control signal is at its datum level and that both said predetermined voltage levels are in a positive-going direction from said datum level, and a square wave output connection for deriving said output square waveform from said suppressor grid of said first valve, the arrangement being such that when said input control signal from said source reaches said first predetermined voltage level the working point on the anode voltage/anode current characteristic of said first valve reaches the upper bend thereof thereby to initiate transitron-like action to cause the voltages of said screen grid and said suppressor grid of said first valve to fall abruptly and said second predetermined voltage level being that at which said input control signal from said source on returning towards said datum level from said first predetermined voltage level causes a reverse transitron-like action.

11. A waveform generating device for producing an output voltage of square waveform in dependence upon a control signal such that the leading edge of each square wave output pulse is generated when the control signal passes in one direction from a datum voltage level through a first predetermined voltage level and the trailing edge of such output pulse is generated when such control signal passes in the reverse direction through a second predetermined voltage level and which includes a first thermionic valve having at least an anode, a suppressor grid, a screen grid, a control grid and a cathode in that order and arranged for transitron action between its screen grid and its suppressor grid and modified in that said screen grid and said suppressor grid are additionally coupled by a resistor, a negative feedback path between said anode and said control grid, a source of input control signals for said first valve, said source comprising a second thermionic valve including at least an anode, a control grid and a cathode in that order, a load resistor in the anode circuit of said second valve, a direct current connection including a series-connected potentiometer network between said anode and a source of potential negative with respect to the cathode of said second valve, and a signal input connection to the control grid of said second valve for supply with an initial control signal in which the signal voltage variations are negative-going with respect to a predetermined datum level, a direct current output connection between an intermediate tapping point on said potentiometer network and said control grid of said first valve, whereby the output signals from said second valve provide input control signals to said first valve of a form such that the control grid of said first valve is biased to cut-off when said input control signal is at its datum level and that both said predetermined voltage levels are in a positive-going direction from said datum level and a square wave output connection for deriving said output square waveform from said screen grid of said first valve, the arrangement being such that when said input control signal from said source reaches said first predetermined voltage level the working point on the anode voltage/anode current characteristic of said first valve reaches the upper bend thereof thereby to initiate transitron-like action to cause the voltage of said screen grid and said suppressor grid of said first valve to fall abruptly and said second predetermined voltage level being that at which said input control signal from said source on returning towards said datum level from said first predetermined voltage level causes a reverse transitron-like action.

References Cited in the file of this patent

UNITED STATES PATENTS

| | | |
|---|---|---|
| 2,060,095 | Mathes | Nov. 10, 1936 |
| 2,275,016 | Koch | Mar. 3, 1942 |
| 2,404,919 | Overbeck | July 30, 1946 |
| 2,494,865 | Fleming-Williams et al. | Jan. 17, 1950 |
| 2,532,534 | Bell | Dec. 5, 1950 |
| 2,584,882 | Johnson | Feb. 5, 1952 |
| 2,594,104 | Washburn | Apr. 22, 1952 |
| 2,692,334 | Blumlein | Oct. 19, 1954 |

FOREIGN PATENTS

| | | |
|---|---|---|
| 573,508 | Great Britain | Nov. 23, 1945 |